Dec. 30, 1924.　　　　　　　　　　　　　　　　　1,520,851
R. F. BROWN
MOTION AND DIRECTION INDICATOR FOR VEHICLES
Filed Feb. 16, 1924　　　2 Sheets-Sheet 1
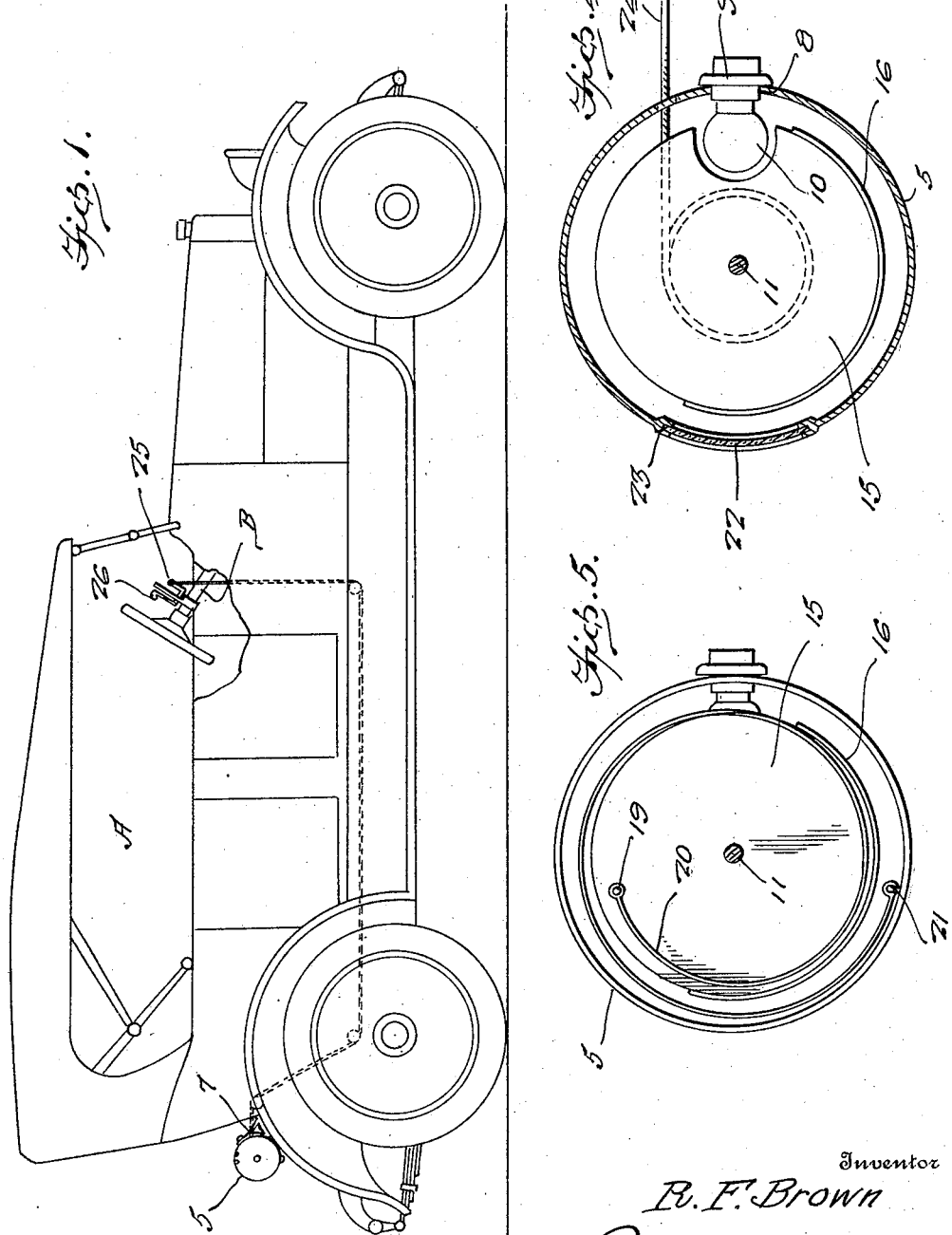
Inventor
R. F. Brown
By　Clarence A. O'Brien
Attorney Dec. 30, 1924.  
R. F. BROWN  
1,520,851  
MOTION AND DIRECTION INDICATOR FOR VEHICLES  
Filed Feb. 16, 1924  2 Sheets-Sheet 2
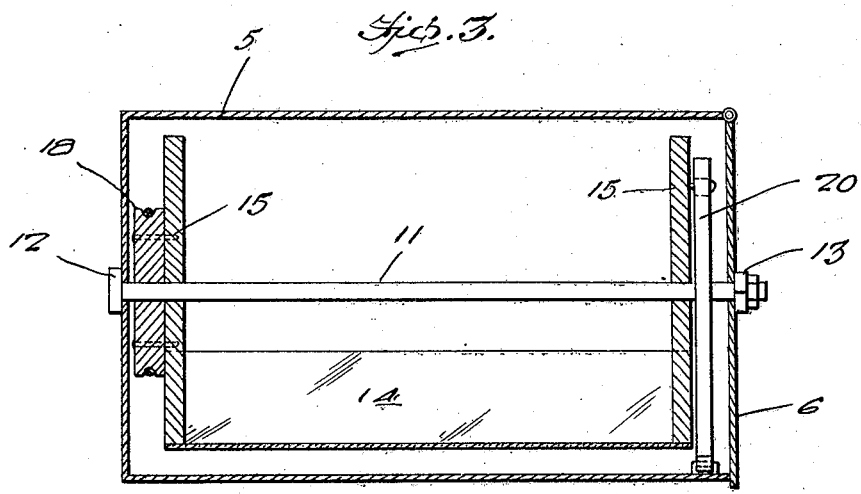
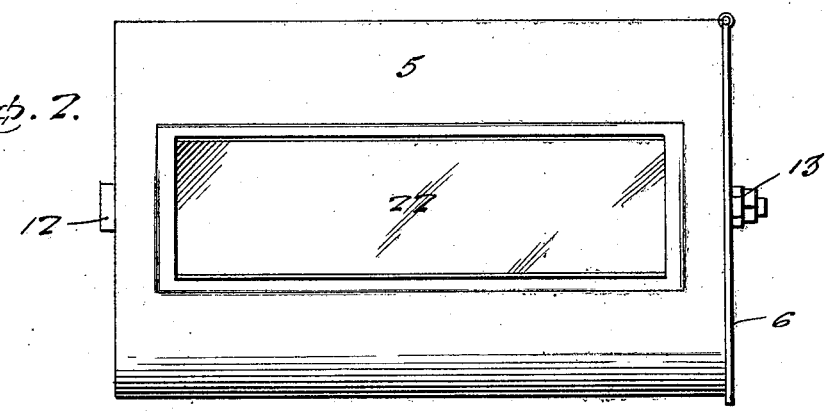
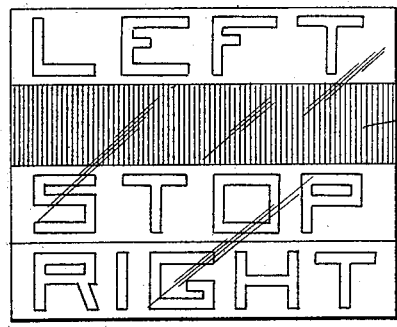
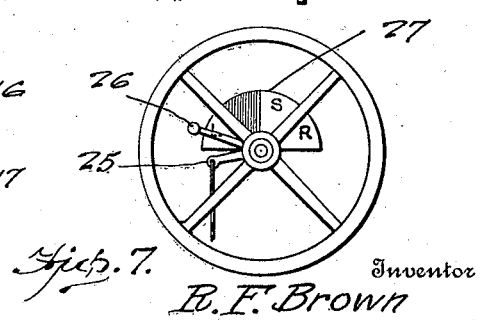
Inventor  
R. F. Brown Patented Dec. 30, 1924.

1,520,851

UNITED STATES PATENT OFFICE.

RAY F. BROWN, OF CHESTER, IOWA.

MOTION AND DIRECTION INDICATOR FOR VEHICLES.

Application filed February 16, 1924. Serial No. 693,310.

*To all whom it may concern:*

Be it known that RAY F. BROWN, a citizen of the United States, residing at Chester, in the county of Howard and State of Iowa, has invented certain new and useful Improvements in Motion and Direction Indicators for Vehicles, of which the following is a specification.

This invention relates to a motion and direction signal for vehicles and has more particular reference to a device of this character that comprises a cylindrical shaped casing adapted to be disposed upon the rear of the vehicle and equipped interiorly with rotary means in the form of a signal box that may be rotated by the driver of the vehicle without moving from his seat so as to bring any desired one of the indicating portions of said rotary signal box to a position directly behind a window in the circular casing for thereby allowing the drivers of approaching vehicles to be aware at all times of the intentions of the driver of the vehicle upon which my improved signal is disposed.

The primary object of the invention is to provide a signal of this character that will be positive in its operation and one that is not liable to become readily out of order, the same including but few parts and these corelated in such a manner as to reduce the possibility of disarrangement to a minimum.

An additional object is to provide a direction indicator for vehicles that may also function as a tail light while the vehicle is moving in a straight path.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the different views:

Figure 1 is a side elevational view of a motor vehicle equipped with a signal constructed in accordance with the present invention, Figure 2 is a side elevational view of the signal structure per se, Figure 3 is a detail longitudinal cross sectional view thereof, Figure 4 is a detail transverse cross sectional view of said signal indicating means per se, Figure 5 is an end elevational view thereof, the end cover plate of the before mentioned signal box casing being removed, Figure 6 is a plan view of the strip of material formed within the casing with transparent direction and motion indications thereon that forms an essential part of the rotary signal box disposed within said casing, and Figure 7 is a top plan view of the steering wheel of the vehicle beneath which and secured to the steering post of the vehicle is an operating member for rotating the signal box within the casing to the desired position, said position being determined by an indicating segment also disposed upon said steering column beneath said steering wheel.

Now having particular reference to the drawings, my novel motion and direction indicator embodies the provision of a cylindrical shaped sheet metal casing 5 open at its outer end and provided with a circular shaped hinged lid 6. This casing 5 may be rigidly disposed upon one of the rear fenders of the vehicle A in any desirable manner and preferably through the medium of a bracket 7 of the type disclosed in Figure 1.

Disposed within an opening 8 within said cylindrical casing 5 is a lamp bulb socket 9 that is adapted to receive an electric lamp 10 that will obviously be disposed within said casing in the manner as clearly shown in Figure 4. This lamp socket 9 is electrically connected to preferably the storage battery of the vehicle in any well known manner, and in the line of circuit between said socket and said storage battery there is preferably disposed a hand switch whereby the current may be completed between said lamp and said storage battery for obviously illuminating the casing 5 whenever the same becomes desirable.

Adapted to be journaled within registering openings in the closed end of the cylindrical casing 5 and the hinged lid 6 is a longitudinal shaft 11 that is headed at one as at 12 and screw threaded at its opposite end for receiving nuts 13 whereby the lid 6 will be maintained closed and said shaft maintained operatively disposed within the casing.

Adapted to be slidably keyed upon this shaft 11 within said cylindrical casing 5 is a signal means designated generally by the reference character 14. The same comprises a pair of spaced plates or disks 15—15 and a sheet of heavy material 16 that is of such a length that when secured at its opposite end to said disks 15—15 but substantially half of these disks will be surrounded by said sheet of material. This sheet of material is formed with transparent indicating indicia in spaced relation to each other, the same being the indicating words "Left", "Stop", and "Right". In addition to these indicating words, this sheet of material is also formed or provided with a cross strip of translucent material 17 preferably of the color red.

Upon the outer side of one of said disks 15 is a cable pulley 18, while connected at one end to a pin 19 carried adjacent the edge of the other of said disks, is a coil spring 20 that is rigidly connected at its opposite end as at 21 to the signal box casing 5 and in this instance, it is to be understood that the action of this spring normally maintains the signal means 14 in such a position within the casing as to dispose the translucent strip of material 17 of said signal strip at a point directly in back of a window 22 positioned within an opening 23 in the outer side of said casing 5.

Connected at one end to said cable pulley 18, is a cable 24 that extends forwardly through an opening in the casing 5 and thence downwardly over guide pulleys carried by the vehicle and then beneath the running board of the vehicle. This cable is then passed upwardly through an opening in the running board and attached at its opposite end to an arm 25 formed upon the lower end of an operating lever 26. This operating lever 26 is rotatably disposed within an opening formed in a segment 27 that is rigidly secured to the steering column B of the motor vehicle A. This segment 27 is formed with indicating letters "L", "S", and "R", as well as indicating means for the remaining indication of the signal box within the casing.

From the foregoing, it will at once be apparent that during the ordinary travel of the vehicle the operating lever 26 is so positioned as to maintain the signal box 14 within the casing so as to position the translucent strip of material 17 of the signal box 14 directly rearwardly of the window 22 in said casing 5 and when the bulb 10 is illuminated, this will indicate that the driver of the vehicle intends to proceed in a straight path.

The spring 20 serves as a means for maintaining the signal box in the position shown in Figures 4 and 5, and when the operator of the vehicle intends to make a right or left hand turn or bring his machine to a stop, he moves the operating lever 26 to the desired point on the segment 27, after which the proper indicating indicia of the signal box will be brought to view behind said window 22 of the casing for thereby warning drivers of approaching cars of the intentions of the operator of the vehicle upon which the signal is installed.

The specific operation, together with numerous advantages of a motion and direction signal of this character will be at once appreciated by those skilled in the art and even though I have herein set forth the most practical embodiments of the invention with which I am at this time familiar, it is nevertheless to be understood that minor changes may be made in the invention without departing from the spirit and scope of the appended claim.

Having thus described my invention what I claim as new and desire to secure by Letters Patent is:

A vehicle signal comprising a cylindrical casing closed at one end and open at its opposite end, a hinged cover for the last named end, a rotor insertible into the casing through the open end, said rotor being provided with a shaft journalled in bearing openings in said closed end and cover, an arcuate transparent signal carrying sheet carried by said rotor, said casing being provided with a sight opening through which the signals on said sheet are rendered visible, spring means connected at one end to the rotor and anchored at its opposite end to the casing, for maintaining the rotor in the predetermined position, and for automatically returning it to said position after each operation, and illuminating elements carried by the casing for projecting light rays through said transparent sheet, and removable means on one end of the aforesaid rotor shaft, cooperating with said hinged cover to maintain the latter closed.

In testimony whereof I affix my signature.

RAY F. BROWN.